United States Patent [19]
Yu

[11] 4,173,121
[45] Nov. 6, 1979

[54] HYBRID DUAL SHAFT GAS TURBINE WITH ACCUMULATOR

[75] Inventor: Mason K. Yu, Birmingham, Mich.

[73] Assignee: American Standard, Inc., New York, N.Y.

[21] Appl. No.: 907,894

[22] Filed: May 19, 1978

[51] Int. Cl.² .............................................. F02C 3/10
[52] U.S. Cl. .............................. 60/39.16 R; 60/39.17; 60/39.68; 60/39.51 R
[58] Field of Search ........ 60/39.04, 39.14 R, 39.16 R, 60/39.17, 39.68

[56] References Cited

U.S. PATENT DOCUMENTS

| | | | |
|---|---|---|---|
| 3,237,404 | 3/1966 | Flanigan et al. | 60/39.16 R |
| 3,257,807 | 6/1966 | Hornschuch et al. | 60/39.68 |
| 3,308,618 | 3/1967 | Jubb et al. | 60/39.68 |
| 3,373,561 | 3/1968 | Jubb | 60/39.68 |
| 3,625,003 | 12/1971 | Liddle et al. | 60/39.25 |
| 3,867,812 | 2/1975 | Van Arsdel | 60/39.68 |
| 3,999,373 | 12/1976 | Bell et al. | 60/39.16 R |

Primary Examiner—Louis J. Casaregola
Attorney, Agent, or Firm—James J. Salerno, Jr.; Robert G. Crooks

[57] ABSTRACT

An automotive gas turbine engine includes a gasifier spool having variable iris control means for regulating air flow to a compressor supplying a primary burner that is operative to produce motive fluid for driving the gasifier turbine and to supply a thermally insulated pressure accumulator located upstream of a secondary burner that exhausts to a variably controlled power turbine nozzle of a power turbine and wherein control means are operative upon engine start to open the variable iris to the gasifier spool and to direct fuel to the primary burner until the gasifier turbine produces a desired pressure in the accumulator and wherein means are provided to sense the pressure within the accumulator and operative following attainment of the desired pressure to close the iris and reduce primary burner fuel flow to a predetermined minimum to maintain gasifier spool speed at between 85% to 95% of full design speed thereof; the control means further including a manual control to the variable power turbine nozzle to direct motive fluid across the power turbine to meet a desired power output therefrom and wherein fuel flow to the secondary burner is maintained to hold a desired power turbine inlet temperature schedule.

3 Claims, 9 Drawing Figures

HYBRID DUAL SHAFT GAS TURBINE WITH ACCUMULATOR

Two shaft gas turbine engines for automotive use are known wherein a gasifier spool and power turbine spool are arranged to have exhaust gases from a combustor directed across separate gasifier and power spool turbines during engine operation.

Such engines have fuel controllers of the type set forth in U.S. Pat. No. 3,999,373, issued Dec. 28, 1976, to Bell et al. In such an arrangement, a vehicle operator controlled accelerator pedal is utilized to establish fuel flow to a burner. The engine control is configured to recognize that the gas generator spool preferably is configured to have reduced inertia by elimination of accessory drive thereon to improve the acceleration characteristics of the engine. The controller enables quick acceleration of the gasifier spool to 100% design speed.

Part load fuel economy, however, may be considerably less than that of a piston engine powered car.

Because of the duty cycle of passenger vehicles, most of the driving is at low power levels. In order to improve fuel economy under such conditions, the power train must give particular attention to fuel consumption at low power levels without incurring performance penalties at higher power levels that are occasionally required during the normal driving cycle.

One prior art approach for reducing part load fuel consumption in a dual shaft gas turbine engine includes the provision of a variable turbine nozzle and power transfer between a power spool and gasifier spool of a two-shaft gas turbine engine as set forth in U.S. Pat. No. 3,237,404, issued Mar. 1, 1966, to Flanigan et al. In this arrangement, the gasifier turbine inlet temperature is adjusted to maintain a desired regenerator temperature for heating inlet air into the gas turbine engine or to define an upper temperature that coincides with the limitations of temperature operation of turbine materials. The temperature limit approach is one attempt to hold a maximum cycle thermal efficiency through a wide range of speed and load levels in two-shaft gas turbine engines.

Another approach to improve fuel consumption in a dual shaft engine is by use of a heat exchanger located in the engine flow path to recover a major portion of the exhaust energy. Still other approaches used to improve fuel economy are based on the principle of power augmentation as produced in arrangements were variable inlet guide vanes are located upstream of the compressor or water injection is used to provide a greater mass flow through the gas turbine engine.

Still another approach is an arrangement as set forth in U.S. Pat. No. 3,625,003, issued Dec. 7, 1971, to Liddle et al for "Split Compressor Gas Turbine". This engine has a lower nominal power output with a better engine brake specific fuel consumption to be utilized under normal driving conditions, which includes driving the car at relatively low power levels during most of its duty cycle of operation.

Yet another approach to improved fuel economy in gas turbine engines is by use of an energy storage system such as the inclusion of a power wheel and/or battery in the system and wherein energy from either the engine or regenerative braking of the engine can be stored for future use. Such systems, however, may result in oversizing an engine to produce desired acceleration and energy consumption at higher power demands of gas turbine engine operation or the storage system itself may have to be oversized. The added weight can decrease the potential efficiency gain in the total system.

Also, inclusion of an accumulator between the gasifier and power section of an engine has been recognized in industrial stationary power plants such as set forth in U.S. Pat. No. 3,257,807, issued June, 1966 to Hornschuck et al; U.S. Pat. No. 3,038,618, issued Mar., 1967 to Jubb et al; and U.S. Pat. No. 3,373,561, issued Mar., 1968 to Jubb. These arrangements show use of an accumulator to assure balanced power distribution from a plurality of power turbines located in exhaust outlets from the accumulator. The gasifier sections of jet engines feed hot gas to the accumulator and the main function of the accumulator is to provide temporary energy storage for the control of output power and speed. There are no claims with respect to a potential improvement of fuel economy or thermal efficiency of the total engine package by regulating power input to a gasifier section and to a secondary burner for maintaining a power demand level from the gas turbine engine combination.

Accordingly, an object of the present invention is to improve two-shaft gas turbine engines including a gasifier spool and a power turbine spool by the provision of means to generate and accumulate high pressure hot gas as potential energy from generating means which includes the gasifier section of a two-shaft automotive gas engine system and wherein the potential energy is stored in a thermally insulated accumulator and selectively made available to the power turbine and wherein the gasifier spool has a variable area inlet controller at the compressor inlet closed for high idle speed and low primary burner fuel flow to maintain the gasifier speed at between 85 to 95 percent of its design speed at relatively low power levels of the duty cycle of the gas turbine engine in the car and wherein a secondary burner is provided between the accumulator and power turbine to serve as a power augmentation device to maintain a desired operator demanded power level from the gas turbine engine.

Yet another object of the present invention is to provide an improved automotive gas turbine engine comprising a gasifier spool having variably controlled air flow inlet means supplying a primary burner that is operative to direct combustion products into driving relationship with a gasifier spool turbine and into a thermally insulated accumulator and wherein a secondary burner is provided downstream of the accumulator to provide power augmentation of the potential energy of accumulated motive fluid within the accumulator to provide motive fluid to an output power turbine under the control of an operator demand positioned variable flow nozzle interposed downstream of the accumulator and the secondary burner and wherein control means are associated with both the primary burner and the secondary burner and operative to control primary burner combustion flow across the gasifier turbine to maintain the gasifier spool at 85 to 95 percent of full design speed thereof and wherein the control means further includes a manual throttle responsive to operator demand to control the variable flow nozzle to direct accumulated potential energy from the accumulator to the turbine to meet the power demand of the vehicle and wherein the control means further includes means operative to control fuel flow to the secondary burner to maintain a desired power turbine inlet temperature schedule to maintain the vehicle power demand with maximum fuel efficiency; a pressure sensitive means being provided to detect the pressure level in the accumulator during normal road operation of the vehicle and operative when the pressure level in the accumulator falls below a predetermined charge pressure to increase air flow and fuel supply to the primary combustor to separate the gasifier spool to hold the potential energy level in the accumulator at a point to produce a best possible fuel consumption while maintaining a desired output power turbine pressure ratio to meet vehicle operator power demand.

The nature of the present invention, its advantages and other objects thereof will be clear to those skilled in the art from the succeeding detailed description of a preferred embodiment of the invention and the accompanying drawings wherein.

Figure 1:
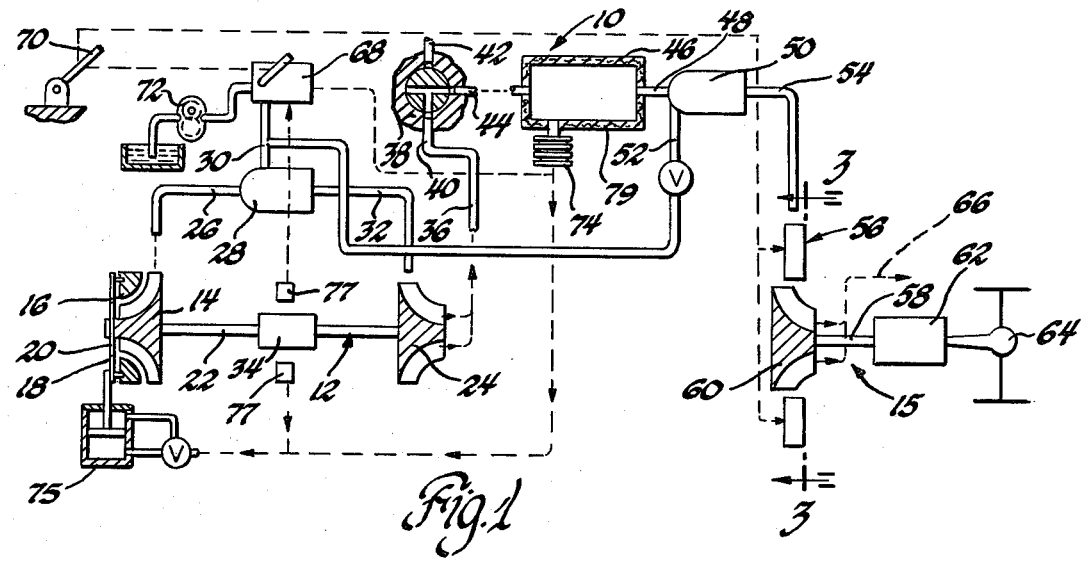
FIG. 1 is a schematic illustration of a dual shaft gas turbine engine for a vehicle including the present invention.

Referring to FIG. 1, a vehicular gas turbine engine 10 is illustrated including a gasifier spool 12 and a power turbine spool 15. More particularly, the gasifier spool 12 includes a compressor 14 having an inlet 16 under the control of a variable area inlet flow controller 18 in communication with ambient air at 20. Such flow controllers are set forth more particularly in U.S. Pat. No. 3,625,003 and U.S. Serial No. 826,641, filed Aug. 22, 1977, with assignee common to this application which is in the form of a movable iris device. Other variable inlet controllers are also suitable for use in the invention.

The compressor is connected by a drive shaft 22 to a gasifier turbine 24. Compressed air from the compressor 14 is directed through an outlet 26 to a primary burner 28 having a fuel supply pipe 30 thereto and an exhaust conduit 32 therefrom for directing combustion products across the gasifier turbine 24 to drive the shaft 22 along with a gasifier compressor 14 thereon. A representatively illustrated accessory load 34 is illustrated interposed between the gasifier compressor 14 and the gasifier turbine 24. It is supplied by a power take-off from the shaft 22 to drive suitable accessory loads of the type found in vehicular gas turbine engines.

Exhaust from the gasifier turbine 24 is through an outlet conduit 36 to a three-way valve 38 having an inlet 40, an outlet 42 connected to atmosphere and a second outlet 44 connected to the inlet of a thermally insulated pressure accumulator 46. The pressure accumulator 46 has an outlet 48 therefrom connected to a secondary burner 50 having a fuel supply pipe 52 thereto and including an outlet conduit 54 directed through a variable area turbine inlet nozzle 56 to a power turbine 60 connected by a shaft 58 to the vehicle power transmission 62, thence to a drive system 64. The power turbine 60 has its exhaust through an outlet 66.

The engine 10 includes a fuel control 68 connected to a suitable power controlling device to meet output power on operator demand. Thus, an accelerator pedal 70 is illustrated coupled to control means for regulating flow from a fuel pump 72 to either the fuel pipe 30 or the fuel pipe 52 and to proportion fuel flow to the primary burner 28 or the secondary burner 50 in accordance with a schedule to be discussed.

Moreover, the fuel control 68 has an input signal thereto from a pressure sensor 74 that senses pressure in the pressure accumulator 46 and directs a proportionate signal thereof to control 68 and also to a servo 75 that selectively controls the position of the variable area flow controller 18.

More particularly, during an engine starting cycle of operation, the controller 18 is closed so that the compressor inlet 16 will be covered to prevent all but a small amount of mass flow of air through the gasifier compressor 14. Accordingly, there are reduced windage losses during initial gas turbine engine operation when the gasifier spool is accelerated by a starter. As the gasifier spool 12 accelerates, its speed is sensed by a speed pickup 77 which directs a speed signal to controller 68. When a predetermined speed is reached, fuel is directed from the controller 68 to the primary burner 28 and concurrently the controller 18 is opened to produce air flow to the primary burner 28 which combines with the fuel from pipe 30 to burn and produce combustion gas flow across the gasifier turbine 24 thereby to produce a further acceleration of the gasifier spool 12. The three-way valve 38 is positioned as shown in FIG. 1 to communicate the inlet 40 with the outlet 44 to direct combustion products from the gasifier turbine 24 into the insulated pressure accumulator 46. Also during this phase of operation, the accelerator pedal is positioned so as to close the variable area turbine inlet nozzle 56 to the power turbine 60. When the gasifier spool 12 reaches a predetermined speed the servo 75 and control 68 are conditioned so that controller 18 is closed and the fuel flow will be cut back by the control 68 to an idle flow level. The air flow through the gasifier compressor 14 is thereby substantially blocked but for a small amount of bleed flow required for cooling and, since there is low windage loss, there is little power absorption within the compressor and, accordingly, the gasifier shaft speed can be maintained at 85 to 95 percent of design speed without requiring a large consumption of fuel.

Meanwhile, the variable area turbine inlet nozzle 56 is controlled by the operator in accordance with power level demand as set by the accelerator pedal 70 to fulfill the vehicle power requirements.

During normal road operation, the gasifier shaft speed is maintained with low fuel consumption and at a high percentage of its design speed and the variable area turbine inlet nozzle 56 constitutes a primary control for motive fluid flow from a potential energy source represented by the pressurized combustion products retained within the accumulator 46. The insulation cover 79 on the accumulator prevents significant thermal losses from the retained gases to atmosphere.

The nozzle 56 is controlled to provide a proper amount of flow from the thermally insulated accumulator 46 to meet demand pedal 70. At the same time, the controller 68 regulates fuel flow to secondary burner 50 to maintain a desired power turbine inlet temperature schedule which will satisfy the demand for power as set by the accelerator pedal 70.

The potential energy level within the accumulator 46 falls as gases flow therefrom to be utilized to meet power demand along with the additional energy input from the secondary burner 50. When the pressure level in the accumulator falls below a desired predetermined level it is sensed by the pressure sensor 74 to condition the servo 75 and control 68 to concurrently open the variable area inlet controller 18 and add fuel to the primary burner 28. The engine will thereby accelerate to recharge the accumulator 46. The system is such that charge and discharge of the accumulator 46 can be accomplished readily without energy losses heretofore associated with storage systems such as flywheel inertia devices within the power train of a gas turbine engine or by operation of an associated electrical alternator or generator for charging an auxiliary battery in a hybrid power system.

During engine operation, the three-way valve 38 is held in its illustrated charge position wherein combustion gas from the gasifier turbine 24 is directed into the thermally insulated pressure accumulator 46. During initial start-up, the three-way valve 38 can be positioned so as to connect the inlet 40 with an outlet 42 to atmosphere thereby defining a standby path that is maintained until the gasifier spool 12 has been accelerated by the starter to a speed where the controller 18 and burner 28 will be operated opened and with fuel flow thereto, respectively, to commence a power input phase of operation at which point the valve 38 is located in its charge position.

Figure 5:
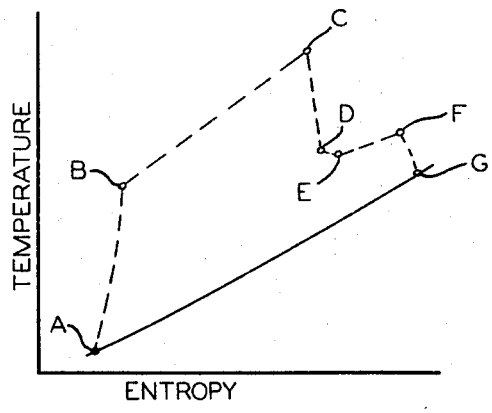
FIG. 5 is a curve of temperature and entropy for the engine operating cycle of the engine set forth in FIG. 1.

The line from points A and B in FIG. 5 represent the energy increase in the gas flow from the inlet 16 of the compressor 14 to the outlet 26 thereof. Additional temperature increase occurs along line B to C because of combustion of fuel within the primary burner 28. Line C to D is produced by energy absorption in the gasifier turbine 24 and the temperature charge represented therein is that which is produced between the inlet 32 to the gasifier turbine 24 and the outlet 36 thereof.

The line between the points D and E is the potential energy of the exhaust gas accumulated within the pressure accumulator 46. The slight temperature drop is obtained across the wall insulation 79 of the accumulator 46. The line between points E and F represents the temperature increase and energy level increase by secondary burner 50 to produce a desired turbine inlet temperature at the power turbine 60 sufficient to meet the power demand of an operator as set by the accelerator pedal 70. The E to F line shows a substantial increase in entropy and an increase in temperature because of the further combustion by fuel and gas within the secondary burner 50. The slope of the line E-F will depend upon the fuel flow to the burner 50 as required to maintain a desired turbine inlet temperature at the inlet to the power turbine 60 along with the best possible fuel consumption for the total gas turbine engine 10.

The temperature loss in the gas flow across the power turbine 60 is represented by the line F-G.

Figure 2:
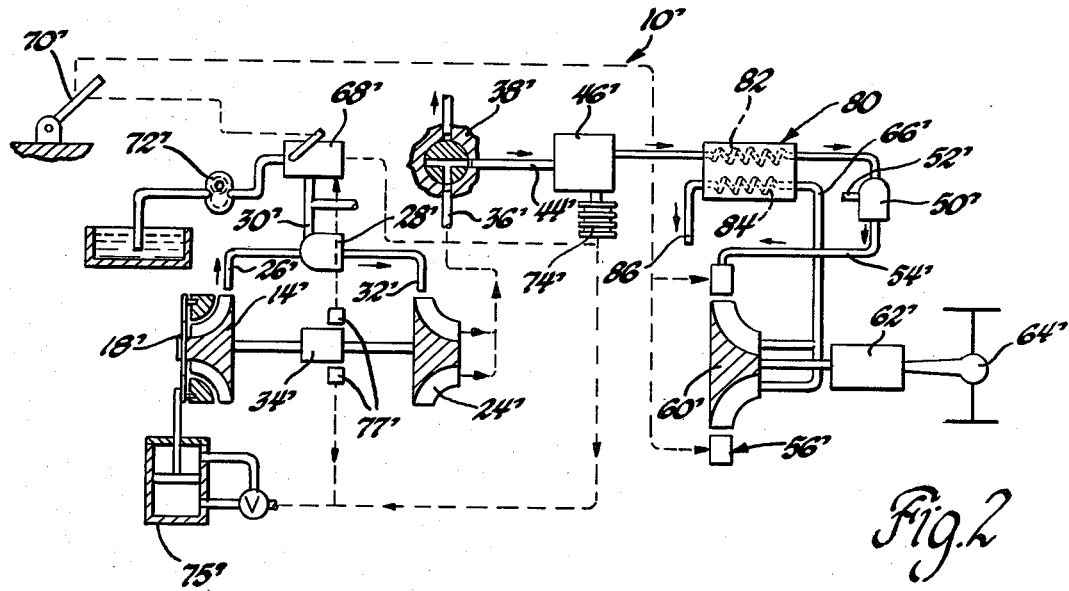
FIG. 2 is a schematic illustration of a dual shaft gas turbine engine for a vehicle representing a second embodiment of the invention illustrated in FIG. 1.
Figure 3:
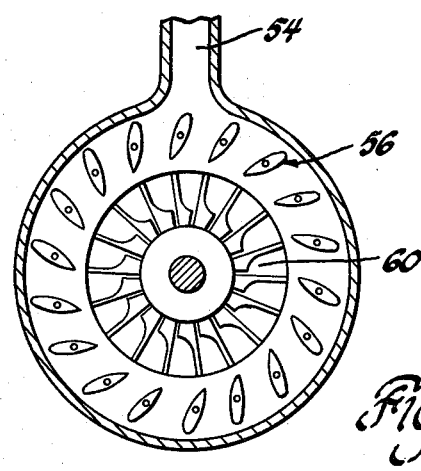
FIG. 3 is a schematic illustration of a variable geometry turbine taken along line 3—3 of FIG. 1.
Figure 4:
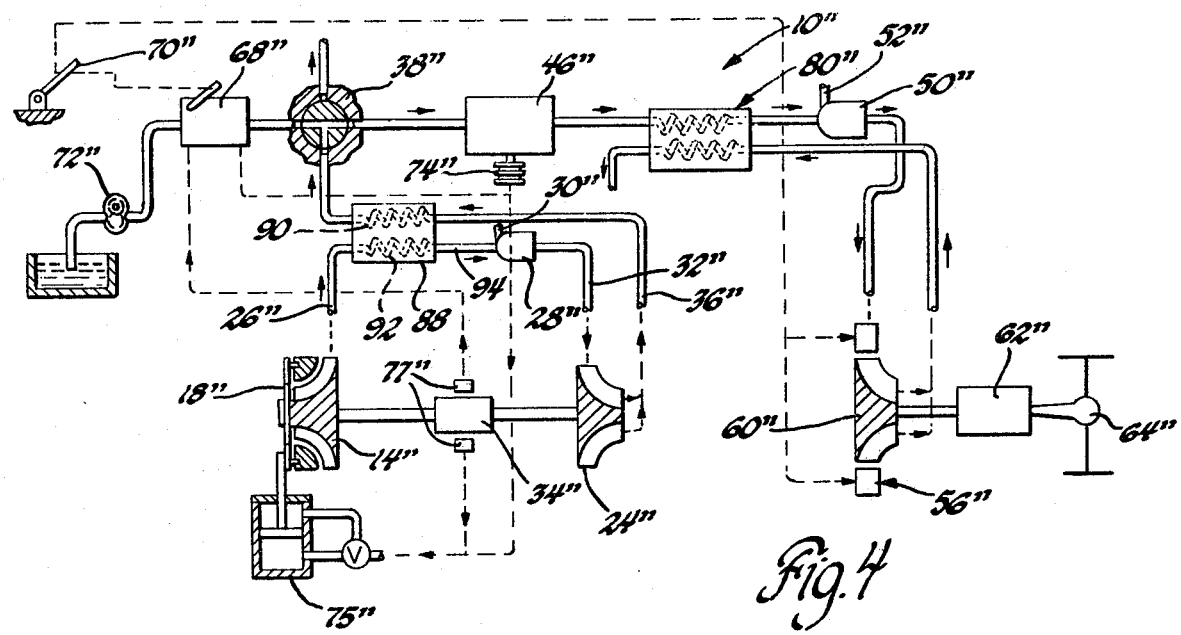
FIG. 4 is a schematic illustration of a third embodiment of the dual shaft gas turbine engine of the present invention.

A second embodiment of the invention is illustrated in FIG. 2 which shows a dual shaft gas turbine engine similar to that illustrated in FIG. 1. For purposes of simplifying the present description, the parts of the dual shaft engine illustrated in FIG. 2 which find common parts in the dual shaft engine of FIG. 1 are designated by like, primed reference numerals. The function of the dual shaft engine 10' in FIG. 2 also corresponds to that previously described with respect to the engine in FIG. 1. In this embodiment, however, a heat exchanger 80 is added between the pressure accumulator 46' and the secondary burner 50'. Heat exchanger 80 includes a first pass 82 through which flow from the pressure accumulator 46' flows to the secondary burner 50'. It further includes a second pass 84 in parallel to the pass 82 and having exhaust flow therethrough from the outlet 66' of the turbine 60' to an exhaust conduit 86 to atmosphere. In the embodiment of FIG. 4, a third version of a dual shaft engine is illustrated. Same parts as those illustrated in the dual shaft engines of FIGS. 1 and 2 are designated with double primed reference numerals.

In the FIG. 4 arrangement, a second heat exchanger 88 is illustrated including a first pass 90 therethrough for receiving exhaust flow from a gasifier turbine outlet 36" for flow through a three-way valve 38" to a pressure accumulator 46". The energy from the pass 90 is exchanged with a pass 92 communicating with the exhaust conduit 26". The outlet from the pass 92 is communicated by a pipe segment 94 with the primary burner 28".

The size of the thermally insulated pressure accumulator in each of the embodiments of the invention depends on the maximum pressure level, the temperature control level of the secondary burner and the driving cycle which is established in accordance with vehicle operator demand.

Figure 6:
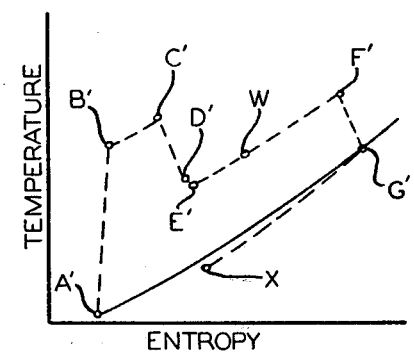
FIG. 6 is a curve of temperature and entropy for the operating cycle of the engine illustrated in FIG. 2.

FIG. 6 is a temperature entropy charge of the operating cycle of the engine in FIG. 2. The illustrated points on the charts correspond to the previously described points on the chart of FIG. 2 but each of the points therein are designated by primed letters. Also, line segment E'-W represents temperature increase in pass 82 and line segment G'-X represents temperature change in pass 84.

Figure 7:
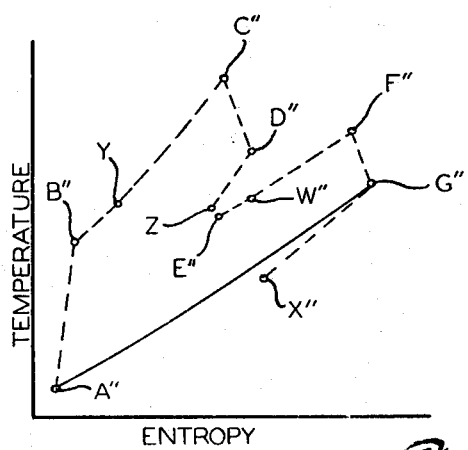
FIG. 7 is a curve of a temperature and entropy in the operating cycle of the engine in FIG. 4.

FIG. 7 shows a temperature entropy chart of the engine operating cycle of the dual shaft engine in FIG. 4. Points in this temperature entropy chart corresponding to those in FIG. 5 and FIG. 6 are designated by double primed letters. Line B"-Y is the cold pass 92 of exchanger 88. Line D"-Z is the hot pass 90 of exchanger 88.

Figure 8:
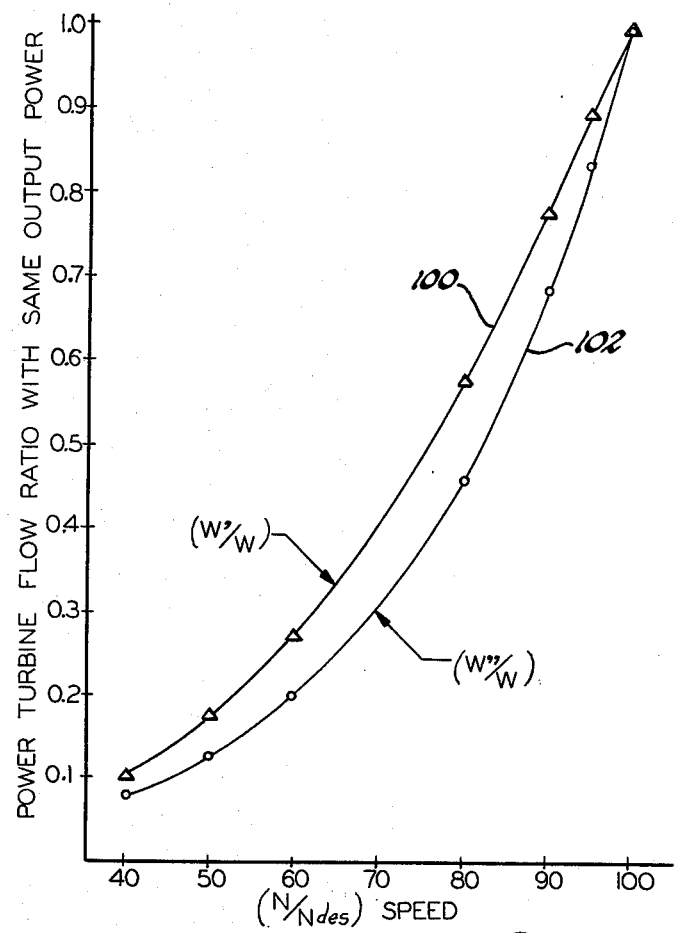
FIG. 8 are curves showing power turbine flow ratio with respect to gasifier speed for conventional cycle dual shaft vehicular gas type turbine engines and for dual shaft gas turbine engines of the present invention.

FIG. 8 shows the turbine flow ratio for a given output power from the power turbine 60 and wherein curve 100 more particularly shows flow ratio of W' to W as a function of percent gasifier speed wherein:

W=the power turbine flow at normal gasifier discharge pressure and temperature without the addition of a pressure accumulator such as pressure accumulator 46 in the dual shaft gas turbine engine 10 of FIG. 1.

W'=power turbine flow with constant pressure in the accumulator 46 and no secondary burner fuel flow.

Curve 102 is the ratio of W" to W wherein:

W"=the power turbine flow with constant pressure in the accumulator 46 and the secondary burner fuel rate set to maintain a constant 1120° K. inlet temperature at the power turbine 60.

FIG. 8 shows a minimal drop in power turbine efficiency when there is no fuel flow to the secondary burner that at 60% gasifier speed, assuming no pressure drop across the accumulator 46 and secondary burner 50. Moreover, only 28% of the conventional type two-shaft gas turbine engine power turbine flow is required to generate the same amount of power for operating an output load. This is due to the fact that the power turbine 60 operates at a pressure ratio (the pressure in the accumulator 46 to the power turbine exit pressure) of about 2:1 and this is compared to about a power turbine pressure ratio of about 1.1 to 1 found in conventional dual shaft gas turbine engines at this low gasifier speed point.

When fuel is added to the secondary burner 50 the power turbine inlet temperature can be maintained at a constant value equal to the maximum level in a conventional dual shaft gas turbine engine of 1120° K. It will be seen from curve 102 that the flow ratio on the ordinate line of FIG. 8 decreases to only 20% under such conditions and at 60% gasifier speed. Extra boost power for short durations of engine demand can be obtained in the present arrangement if the power turbine inlet temperature is raised to a maximum gasifier turbine inlet temperature of 1280° K.

Figure 9:
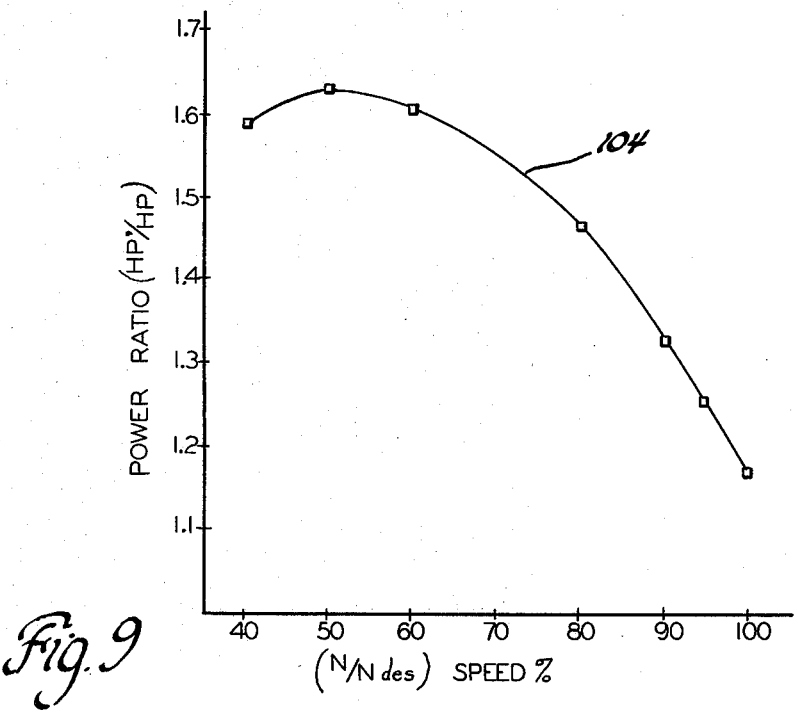
FIG. 9 is a curve showing of a power ratio of a dual shaft engine with and without secondary burner fuel flow.

The curve in FIG. 9 shows the power output increase obtained at an operating temperature of 1280° K. The power ratio HP' to HP is the ratio of output power produced by the dual shaft engine of FIG. 1 with the secondary burner exit temperature at 1280° K. to the power with no secondary burner fuel flow. Particularly, the power designations are as follows:

HP'=power with secondary power exit temperature at 1280° K. and power turbine pressure ratio constant at 1.80 to 1.

HP=power with no secondary burner fuel flow.

Power output increase obtained at the power ratios with an elevated turbine inlet temperature of 1280° K. to that attained with no secondary fuel flow are shown in FIG. 9 by the curve 104 as a function of the percent speed of a gasifier spool 12 with respect to its full design speed of operation. Because of this power boost capability, the nominal engine rating required to produce desired vehicle performance can be lowered with a resultant reduction in the size and mass of the component parts of the gas turbine engine.

The combination of optimum gasifier section SFC (specific fuel consumption) operation, increased power turbine pressure ratio as well as reduced engine size affords overall vehicle fuel economy gains.

While the embodiments of the present invention, as herein disclosed, constitute a preferred form, it is to be understood that other forms might be adopted.

The embodiments of the invention in which an exclusive property or privilege is claimed are defined as follows:

1. An automotive gas turbine engine comprising: a gasifier spool having a compressor on one end thereof and a gasifier turbine on the opposite end thereof, means including a variable area inlet for controlling air flow to said compressor during operation of said gasifier spool, a power turbine, a primary burner receiving air from said compressor and operative to produce motive fluid for driving said gasifier turbine, means including a thermally insulated accumulator and a secondary burner to receive exhaust flow from said gasifier turbine, means including a variable area nozzle to control flow from said accumulator and said secondary burner to said power turbine, control means operative on engine start to open said variable area inlet and to direct fuel to said primary burner until the gasifier turbine increases its speed to produce a predetermined charge pressure in said accumulator, said control means including a pressure sensor operative following attainment of said predetermined charge pressure to close said inlet and cut back fuel flow to a predetermined idle fuel flow level in said primary burner, said idle fuel flow level to said primary combustor being selected to maintain said gasifier spool at eighty-five to ninety-five percent of its full design speed, said control means including a manual operator concurrently controlling said variable area nozzle to direct a controlled amount of motive fluid from said accumulator to said power turbine to meet the vehicle power requirements, said control means further being operative to control fuel flow to said secondary burner to maintain a desired power turbine inlet temperature schedule to meet the driver demanded vehicle output power, and said pressure sensor detecting the pressure level in said accumulator during road operation and operative when the pressure level in said accumulator falls below the maximum predetermined charge pressure to open said variable area inlet and to add fuel to said primary burner whereby the gasifier spool will accelerate to recharge the accumulator to maintain the maximum predetermined pressure level therein whereby optimized gasifier section fuel consumption is attained and increased power turbine pressure ratios are maintained.

2. An automotive gas turbine engine comprising: a gasifier spool having a compressor on one end thereof and a gasifier turbine on the opposite end thereof, means including a variable area inlet for controlling air flow to said compressor during operation of said gasifier spool, a power turbine, a primary burner receiving air from said compressor and operative to produce motive fluid for driving said gasifier turbine, means including a thermally insulated accumulator and a secondary burner to receive exhaust flow from said gasifier turbine, means including a variable area nozzle to control flow from said accumulator and said secondary burner to said power turbine, control means operative on engine start to open said variable area inlet and to direct fuel to said primary burner until the gasifier turbine increases its speed to produce a predetermined charge pressure in said accumulator, said control means including a pressure sensor operative following attainment of said predetermined charge pressure to close said inlet and cut back fuel flow to a predetermined idle fuel flow level in said primary burner, said idle fuel flow level to said primary combustor being selected to maintain said gasifier spool at eighty-five to ninety-five percent of its full design speed, said control means including a manual operator concurrently controlling said variable area nozzle to direct a controlled amount of motive fluid from said accumulator to said power turbine to meet the vehicle power requirements, said control means further being operative to control fuel flow to said secondary burner to maintain a desired power turbine inlet temperature schedule to meet the driver demanded vehicle output power, and said pressure sensor detecting the pressure level in said accumulator during road operation and operative when the pressure level in said accumulator falls below the maximum predetermined charge pressure to open said variable area inlet and to add fuel to said primary burner whereby the gasifier spool will accelerate to recharge the accumulator to maintain the maximum predetermined pressure level therein whereby optimized gasifier section fuel consumption is attained and increased power turbine pressure ratios are maintained, a primary heat exchanger having a first pass in series flow connection between said accumulator and said variable area nozzle and having a second pass to direct waste energy from the exhaust of said power turbine to said first pass whereby energy enhancement of turbine inlet combustion gases is produced.

3. An automotive gas turbine engine comprising: a gasifier spool having a compressor on one end thereof and a gasifier turbine on the opposite end thereof, means including a variable area inlet for controlling air flow to said compressor during operation of said gasifier spool, a power turbine, a primary burner receiving air from said compressor and operative to produce motive fluid for driving said gasifier turbine, means including a thermally insulated accumulator and a secondary burner to receive exhaust flow from said gasifier turbine, means including a variable area nozzle to control flow from said accumulator and said secondary burner to said power turbine, control means operative on engine start to open said variable area inlet and to direct fuel to said primary burner until the gasifier turbine increases its speed to produce a predetermined charge pressure in said accumulator, said control means including a pressure sensor operative following attainment of said predetermined charge pressure to close said inlet and cut back fuel flow to a predetermined idle fuel flow level in said primary burner, said idle fuel flow level to said primary combustor being selected to maintain said gasifier spool at eighty-five to ninety-five percent of its full design speed, said control means including a manual operator concurrently controlling said variable area nozzle to direct a controlled amount of motive fluid from said accumulator to said power turbine to meet the vehicle power requirements, said control means further being operative to control fuel flow to said secondary burner to maintain a desired power turbine inlet temperature schedule to meet the driver demanded vehicle output power, and said pressure sensor detecting the pressure level in said accumulator during road operation and operative when the pressure level in said accumulator falls below the maximum predetermined charge pressure to open said variable area inlet and to add fuel to said primary burner whereby the gasifier spool will accelerate to recharge the accumulator to maintain the maximum predetermined pressure level therein whereby optimized gasifier section fuel consumption is attained and increased power turbine pressure ratios are maintained, a primary heat exchanger having a first pass in series flow connection between said accumulator and said variable area nozzle and having a second pass to direct waste energy from the exhaust of said power turbine to said first pass whereby energy enhancement of turbine inlet combustion gases is produced, and a secondary exchanger interposed between said gasifier turbine and said accumulator and including means operative to preheat primary burner inlet air.

* * * * *

UNITED STATES PATENT AND TRADEMARK OFFICE
CERTIFICATE OF CORRECTION

PATENT NO. : 4,173,121
DATED : November 6, 1979
INVENTOR(S) : MASON K. YU

It is certified that error appears in the above-identified patent and that said Letters Patent are hereby corrected as shown below:

On the Cover Page

Following [73] Assignee;
cancel "American Standard, Inc., New York, N.Y."
and insert -- General Motors Corporation, Detroit, Michigan -- and following Attorney, Agent, or Firm,
cancel "James J. Salerno, Jr.; Robert G. Crooks"
and insert -- J. C. Evans --.

Patent
Column  Line 5    47    Change "charge" to -- change --.

Signed and Sealed this

Twenty-second Day of July 1980

[SEAL]

Attest:

SIDNEY A. DIAMOND

Attesting Officer  Commissioner of Patents and Trademarks